United States Patent
Li et al.

(10) Patent No.: US 11,769,289 B2
(45) Date of Patent: Sep. 26, 2023

(54) RENDERING VIRTUAL ARTICLES OF CLOTHING BASED ON AUDIO CHARACTERISTICS

(71) Applicant: Lemon Inc., Grand Cayman (KY)

(72) Inventors: Yunzhu Li, Los Angeles, CA (US); Haiying Cheng, Culver City, CA (US); Chen Sun, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 219 days.

(21) Appl. No.: 17/353,296

(22) Filed: Jun. 21, 2021

(65) Prior Publication Data
US 2022/0406001 A1     Dec. 22, 2022

(51) Int. Cl.
| G06T 15/04 | (2011.01) |
| G06T 17/20 | (2006.01) |
| G06T 13/20 | (2011.01) |
| G10L 25/48 | (2013.01) |
| G10L 25/03 | (2013.01) |
| G06V 40/10 | (2022.01) |

(52) U.S. Cl.
CPC ............ *G06T 15/04* (2013.01); *G06T 13/205* (2013.01); *G06T 17/20* (2013.01); *G06V 40/10* (2022.01); *G10L 25/03* (2013.01); *G10L 25/48* (2013.01); *G06T 2210/16* (2013.01); *G06T 2210/62* (2013.01)

(58) Field of Classification Search
CPC ....... G06T 15/04; G06T 13/205; G06T 17/20; G06T 2210/16; G06T 2210/62; G06V 40/10; G10L 25/03; G10L 25/48
See application file for complete search history.

(56) References Cited

U.S. PATENT DOCUMENTS

2015/0235416 A1* 8/2015 Coon .................. G06T 17/20
                                                                      345/423
2018/0197578 A1* 7/2018 Ridder ................ G11B 27/031
2020/0306640 A1   10/2020 Kolen et al.
(Continued)

FOREIGN PATENT DOCUMENTS

CN       101414322 A1    4/2009
CN        10213640 A     9/2019
(Continued)

OTHER PUBLICATIONS

International Search Report dated Sep. 26, 2022 in PCT Application No. PCT/SG2022/050294.

*Primary Examiner* — Michelle Chin
(74) *Attorney, Agent, or Firm* — Faegre Drinker Biddle & Reath LLP

(57) ABSTRACT

Systems and methods for generating a virtual article of clothing at a display are described. Some examples may include: obtaining video data and audio data, analyzing the video data to determine one or more body joints of a target object appearing in the video data. A mesh based on the determined one or more body joints may be generated. The audio data may be analyzed to determine audio characteristics associated with the audio data. Texture rendering information associated with a virtual article of clothing may be determined based on the audio characteristics. A rendered video may be generated by rendering the virtual article of clothing to the generated mesh using the texture rendering information.

20 Claims, 10 Drawing Sheets

(56) References Cited

U.S. PATENT DOCUMENTS

2020/0380031 A1 12/2020 Zhou et al.
2020/0401372 A1 12/2020 Vilermo et al.
2021/0118239 A1 4/2021 Santesteban et al.

FOREIGN PATENT DOCUMENTS

| CN | 112034984 A | 12/2020 |
| CN | 112274926 A | 1/2021 |
| CN | 112637622 A | 4/2021 |

* cited by examiner

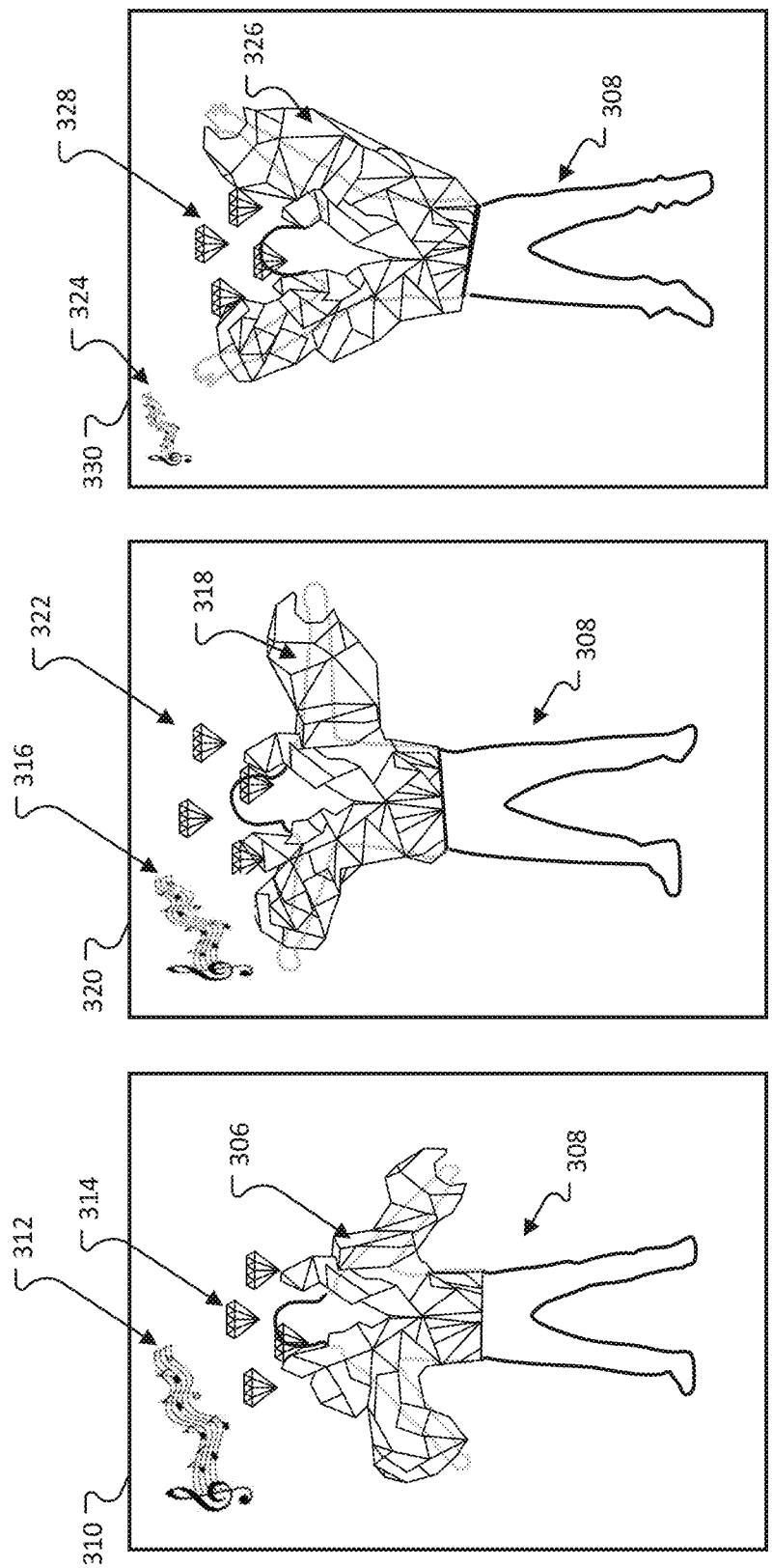

RENDERING VIRTUAL ARTICLES OF CLOTHING BASED ON AUDIO CHARACTERISTICS

BACKGROUND

Video editing techniques are widely available to provide users various way to edit videos. For example, the users may edit a video to add a visual effect and/or music to the video. However, many of the video editing techniques do not consider controlling the visual effect based on audio data. Hence, there remains a need to develop video editing techniques for rendering a video effect synchronization to enhance the user experience.

It is with respect to these and other general considerations that the aspects disclosed herein have been described. Also, although relatively specific problems may be discussed, it should be understood that the examples should not be limited to solving the specific problems identified in the background or elsewhere in this disclosure.

SUMMARY

In accordance with at least one example of the present disclosure, a method for generating a virtual article of clothing at a display is described. The method may include obtaining video data and audio data; analyzing the video data to determine one or more body joints of a target object appearing in the video data; generating a mesh based on the determined one or more body joints; analyzing the audio data to determine audio characteristics; determining texture rendering information associated with a virtual article of clothing based on the audio characteristics; and generating a rendered video by rendering the virtual article of clothing to the generated mesh using the texture rendering information.

In accordance with examples of the present disclosure, a computing device for generating a virtual article of clothing at a display is described. The computing device may include a processor and a memory having a plurality of instructions stored thereon that, when executed by the processor, causes the computing device to: obtain video data and audio data; analyze the video data to determine one or more body joints of a target object appearing in the video data; generate a mesh based on the determined one or more body joints; analyze the audio data to determine audio characteristics; determine texture rendering information associated with a virtual article of clothing based on the audio characteristics; and generate a rendered video by rendering the virtual article of clothing to the generated mesh using the texture rendering information.

In accordance with examples of the present disclosure, a non-transitory computer-readable medium storing instructions for generating a virtual article of clothing at a display is described. The instructions when executed by one or more processors of a computing device, cause the computing device to: obtain video data and audio data; analyze the video data to determine one or more body joints of a target object appearing in the video data; generate a mesh based on the determined one or more body joints; analyze the audio data to determine audio characteristics; determine texture rendering information associated with a virtual article of clothing based on the audio characteristics; and generate a rendered video by rendering the virtual article of clothing to the generated mesh using the texture rendering information.

Any of the one or more above aspects in combination with any other of the one or more aspects. Any of the one or more aspects as described herein.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

Non-limiting and non-exhaustive examples are described with reference to the following Figures.

FIG. 3C-3E depict an example of rendered frames of a video effect in accordance with examples of the present disclosure;

DETAILED DESCRIPTION

Figure 1:
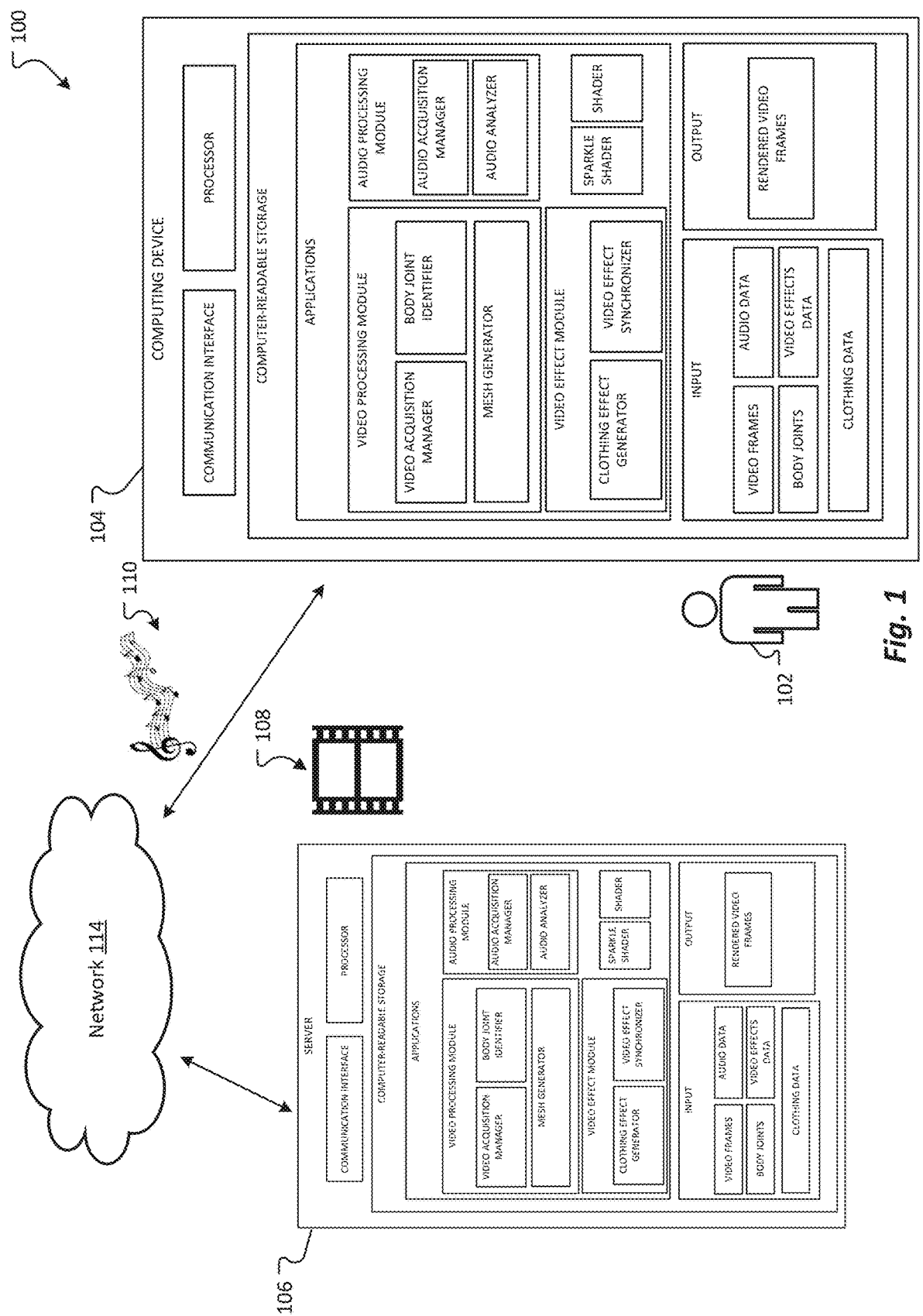
FIG. 1 depicts an example virtual article of clothing rendering system in accordance with examples of the present disclosure.

In the following detailed description, references are made to the accompanying drawings that form a part hereof, and in which are shown by way of illustrations specific aspects or examples. These aspects may be combined, other aspects may be utilized, and structural changes may be made without departing from the present disclosure. Aspects may be practiced as methods, systems or devices. Accordingly, aspects may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In accordance with examples of the present disclosure, a video effect synchronization system allows a user to interact with an article of clothing, making the clothing more lively and more interactive, by applying audio-reactive video effects to one or more virtual articles of clothing displayed in a video clip. For example, the user may choose a virtual article of clothing from a clothing library; the virtual article of clothing may be rendered onto or otherwise attached to a three-dimensional mesh that is generated based on a combination of body joints. In some examples, the virtual article of clothing may be any object that can be rendered onto or otherwise attached to a three-dimensional mesh that is generated based on a combination of body joints. In some examples, the article of clothing may include a video effect configured by one or more video effect parameters associated with the virtual article of clothing. As an example, the video effect parameters may include, but are not limited to, a transparency of the article of clothing, a sparkle effect associated with the virtual article of clothing, a color of the virtual article of clothing, and/or a reflectivity associated with the virtual article of clothing. The virtual article of clothing may be associated with a specific three-dimensional mesh (e.g., a torso mesh, a head mesh, a legs mesh) such that the virtual article of clothing can be attached to or otherwise rendered onto the generated mesh. It should be appreciated that the virtual article of clothing may appear to move as the user depicted in the video sequence moves; in some examples, a user's body part, such as a hand, head, foot, or otherwise may occlude the virtual article of clothing. Accordingly, as the virtual article of clothing is attached to the mesh, the body part may appear in front of the virtual article of clothing.

In an illustrative aspect, a texture associated with the virtual article of clothing may be mapped to a three-dimensional mesh that is generated based on a combination of one or more body joints of a target object tracked in the video clip. To do so, body joint identification may be performed to separate or identify a list of body joints from one or more target subjects of the video clip. The three-dimensional mesh may be generated based on the one or more joints; the texture, color, speed of color change, and physically-based rendering (PBR) material parameters may be based on music characteristics of the audio music.

For example, based on the music characteristics (e.g., beat information and/or frequency information) of the audio music, one or more characteristics of the texture may be changed by a shader configured to render the texture of the virtual article of clothing. In examples, the music characterization may be performed to determine the music characteristics of the audio music. Alternatively, if the audio music was selected by the user from a music library, the music characteristics may be embedded in the audio music as metadata. As an example, the texture of the virtual article of clothing may include rendering effects located around the virtual article of clothing and such effects may change based on the corresponding beat characteristics or frequency spectrum of the audio music. Accordingly, one or more video effect parameters may be periodically (e.g., every beat) updated based on the audio music and the video clip. The video effect synchronization allows the texture of the virtual article of clothing to react to the music beat of the audio music. In some examples, a distance between one or more body parts (e.g., hands of the user) may also influence the texture. For example, the color of the texture rendered by the shader may be changed based on a distance between hands depicted in the video. Further, a secondary shader, such as a sparkle shader, may be applied to the virtual article of clothing and/or may be used to generate another effect within the video, such as a crystal, animation, or other graphic.

FIG. 1 depicts a virtual article of clothing rendering system 100 for rendering one or more video effects in accordance with examples of the present disclosure. For example, a user 102 may generate, receive, acquire, or otherwise obtain a video clip 108. Subsequently, the user may select audio music 110 to be added to the video clip 108. In some examples, the music 110 may be preset by the system 100. The virtual article of clothing rendering system 100 allows the user 102 to virtually try on a virtual article of clothing that may be attached to one or more three-dimensional meshes created from one or more targeted body joints of a target subject in the video clip 108 based on the music 110. To do so, the virtual article of clothing rendering system 100 includes a computing device 104 associated with the user 102 and a server 106 that is communicatively coupled to the computing device 104 via a network 114. The network 114 may include any kind of computing network including, without limitation, a wired or wireless local area network (LAN), a wired or wireless wide area network (WAN), and/or the Internet.

In examples, the user 102 may utilize the computing device 104 to acquire the video clip 108 and the music 110. The user 102 may generate the video clip 108 using a camera communicatively coupled to a computing device 104. In such an example, the video effect, such as but not limited to a color, opacity, rotation, and a number of other graphics (e.g., sparkle) of a virtual article of clothing may be synchronized to the music 110 in or near real-time to allow the user 102 to appear as if they are actually wearing the virtual article of clothing, whereby the change in texture information of the virtual article of clothing may change in accordance with the music. In examples, a user may view the video with the virtual article of clothing at a display (e.g., a display 705) as the user is taking the video on the computing device 104. Alternatively, or additionally, the user 102 may receive, acquire, or otherwise obtain the video clip 108 on the computing device 104. In some examples, the user 102 may edit the video clip 108 to add the video effect based on the music 110. In some aspects, the user 102 may utilize the computing device 104 to transmit the video clip 108 and the music 110 to the server 106 via the network 114. The computing device 104 may be any one of a portable or non-portable computing device. For example, the computing device 104 may be a smartphone, a laptop, a desktop, a server. The video clip 108 may be acquired in any format and may be in a compressed and/or decompressed form.

The computing device 104 is configured to analyze each frame of the video clip 108 to identify body joints of one or more target subjects in the frame. For example, a body joint algorithm may define a list of body joints that are to be identified and extracted from the video clip 108. The body joints may include, but are not limited to, a head, neck, pelvis, spine, right/left shoulder, right/left upper arm, right/left forearm, right/left hand, right/left thigh, right/left leg, right/left foot, and right/left toe.

The computing device 104 is configured to receive audio music 110 selected by the user 102 to be added to the video clip 108 from a music library. Alternatively, in some aspects, the audio music 110 may be associated with the video effect. In such aspects, the video effect may include default music to be added to the video clip 108. In some aspects, the audio music 110 may be extracted from the video clip 108. The computing device 104 is configured to analyze the audio data to determine beat information or frequency spectrum information of the audio music 110. For example, as described above, the computing device 104 may determine beat characteristics of each beat through an automatic beat tracking algorithm. It should be appreciated that, in some aspects, the music beat characterization may be embedded in the music as metadata. The music beat characterization may include a number and relative positions of accented and unaccented beats of the audio music 110. For example, if the audio music 110 has a 4/4 beat structure, each section has four beats with different beat intensity: strong beat, weak beat, second strong beat, and weak beat.

Alternatively, or additionally, the computing device 104 may determine frequency spectrum characterization of the audio music. For example, the computing device 104 may determine an average frequency spectrum for every beat of the audio music. It should be appreciated that, in some aspects, the frequency spectrum characterization may be embedded in the music as metadata.

The video effect includes video effect parameters that control how the virtual article of clothing looks or otherwise is rendered. In some aspects, the video effect parameters may control PBR material associated with a texture that is rendered by a shader. In the illustrative aspect, the parameters of the video effect may be periodically (e.g., every beat) updated based on the audio music and the video clip. In some examples, one or more video effect parameters may be configured based on a distance between two body parts of the user. In other words, the video effect synchronization allows the virtual article of clothing to react to a music beat in the video clip.

In some aspects, the user may choose a virtual article of clothing and/or a video effect be applied to the video clip 108 based on the video effect parameters. The video effect parameters are configured to control which virtual article of clothing is applied to which three-dimensional mesh around which plurality of joints of the user in the video clip and/or how the PBR material is affected by the music. In other words, the video effect parameters define one or more meshes based on a plurality of body joints, where the mesh may provide attachment points or surfaces that the virtual article of clothing may be rendered to. For example, the video effect may be applied to the virtual article of clothing. Alternatively, visual characteristics of the virtual article of clothing may be based on a beat intensity of the music. For example, if the audio music has a 4/4 beat structure and is strong, one set of video effect parameters may be selected (e.g., FIG. 3A). If the audio music has a 4/4 beat structure and is weak, another set of video effect parameters may be selected (e.g., FIG. 3B). If the audio music has a 4/4 beat structure and is weak, a third set of video effect parameters may be selected (e.g., FIG. 3C). As another example, a video effect parameter for a 4/4 beat structure may be different than a video effect parameter for a 3/4 beat structure. That is, the beat structure and the tracked beat may be used to select a video effect parameter; the video effect parameter may influence one or more aspects of a shader that is used to render the virtual article of clothing to a display. Alternatively, or in addition, the video effect parameter may be determined based on the frequency spectrum range. For example, a first frequency spectrum may cause a first video effect parameter to be selected; a second frequency spectrum may cause a second video effect parameter to be selected; and a third frequency spectrum may cause a third video effect parameter to be selected. In examples, the different frequency spectrums may correspond to a high spectrum range (e.g., 4 kHz-20 Hz), a medium spectrum range (e.g., 500 Hz-4 kHz), and a low spectrum range (e.g., 20 Hz-500 Hz). In other words, the beat or spectrum of the audio music may control texture information associated with how a shader renders the virtual article of clothing to the video clip.

In addition, the music characteristics of the audio music may also control one or more sparkle effects to be applied to the virtual article of clothing and/or to other graphics around the user depicted in the video. For example, a metallic effect may be applied to the virtual article of clothing, where the video effect parameter may control to which portion of the virtual article of clothing the sparkle shader is applied and/or what type of sparkle graphic (e.g., crystals) are applied to the video clip. Accordingly, the computing device 104 may determine sparkle characteristics based on the beat characteristics. For example, if the audio music has a 4/4 beat structure, a strong sparkle effect may be applied to a strong beat and a weak sparkle effect may be applied to a weak beat. Alternatively, the sparkle characteristics may be determined based on the frequency spectrum range.

Additionally, or alternatively, an animation speed of the additional graphic rendered by the sparkle shader may be controlled based on the beat characteristics or the frequency spectrum range. For example, crystals may spin around a user faster during a strong beat whereas such crystals may spin around a user slower during a weak beat.

Once the video effect is ready to be added to the video clip, the computing device 104 may modify the virtual article of clothing to blend a two-dimensional (2D) texture of the virtual article of clothing to a three-dimensional (3D) mesh around the body joints. The layering and blending of the 2D animated object on the 3D mesh may create a 3D-like virtual article of clothing. Subsequently, the computing device 104 may synchronize the video effect to the music beat of the audio music to generate a rendered video with the video effect, which may be presented to the user on a display (e.g., a display 705) that is communicatively coupled to the computing device 104. It should be appreciated that the video effect may be synchronized to the music beat in or near real-time to allow the user to view the video effect around the mesh generated based on the one or more body joints on the display as the user is taking the video. Alternatively, or additionally, the video effect may be synchronized to the music beat by the server 106. In such aspects, the video effect may be applied to the video clip 108 once the video clip 108 is uploaded to the server 106 to render the video effect.

Figure 2:
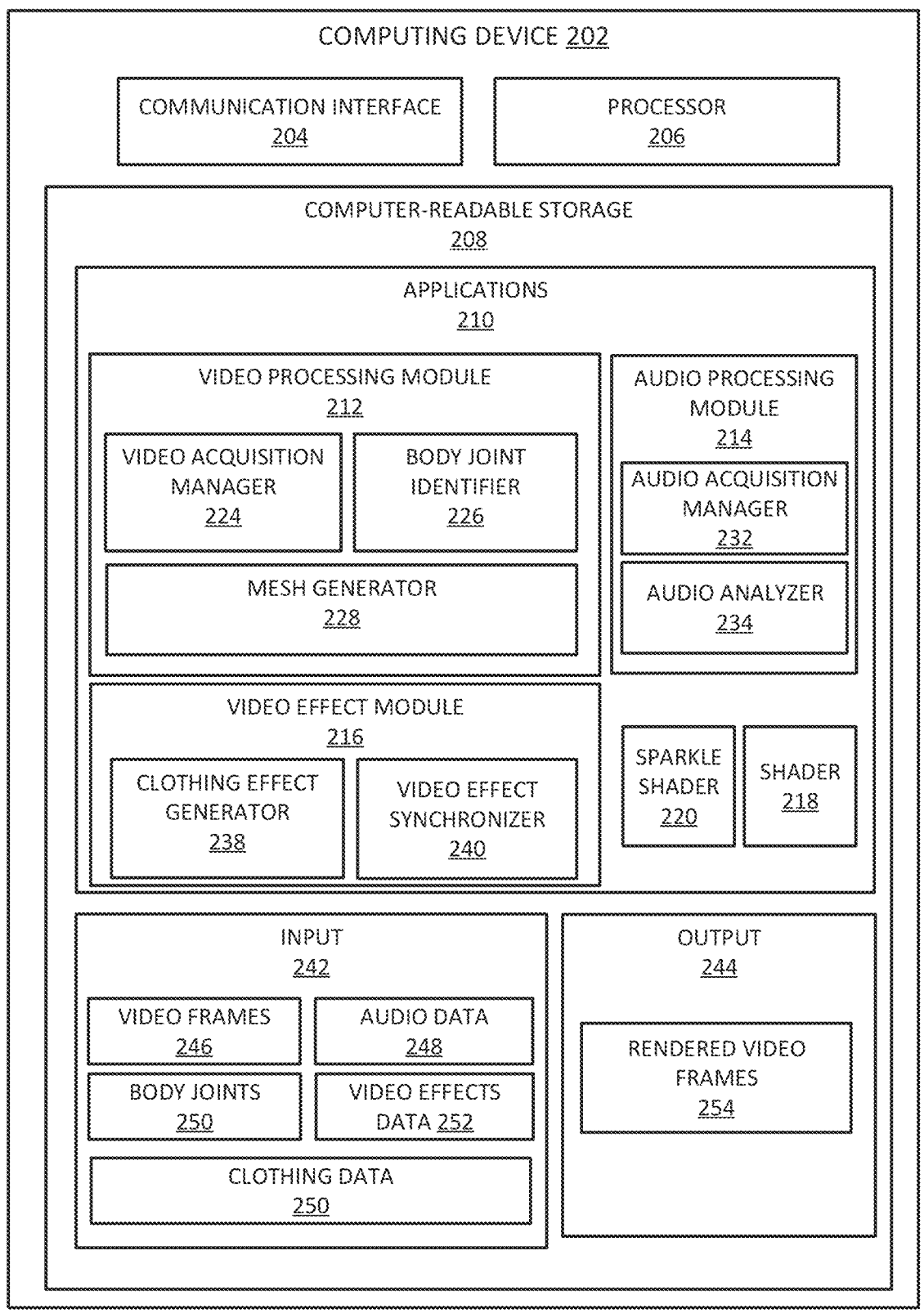
FIG. 2 depicts details of a computing device of the virtual article of clothing rendering system of FIG. 1 in accordance with examples of the present disclosure.

Referring now to FIG. 2, the computing device 202 in accordance with examples of the present disclosure is described. The computing device 202 may be the same as or similar to the computing device 104 previously described in FIG. 1. The computing device 202 may include a communication interface 204, a processor 206, and a computer-readable storage 208. In examples, the communication interface 204 may be coupled to a network and receive the video clip 108 and the audio music 110 (FIG. 1). The video clip 108 (FIG. 1) may be stored as video frames 246 and the music 110 may be stored as audio data 248 of the input 242.

In some examples, one or more video effects may also be received at the communication interface 204 and stored as the video effects data 252. The video effects data 252 may include one or more video effect parameters associated with the video effect. The video effect parameters may define, but are not limited to, how the texture of the virtual article of clothing is rendered to and/or attached to a mesh around one or more joints of a body in a video clip.

In examples, one or more applications 210 may be provided by the computing device 104. The one or more applications 210 may include a video processing module 212, an audio processing module 214, a video effect module 216, a shader 218, and a sparkle shader 220. The video processing module 212 may include a video acquisition manager 224, a body joint identifier 226, and a mesh generator 228. The video acquisition manager 224 is configured to receive, acquire, or otherwise obtain video data that includes one or more video frames. Additionally, the body joint identifier 226 is configured to identify one or more body joints of one or more target subjects in the frame.

The mesh generator 228 is configured to generate a mesh based on the one or more body joints of the one or more target subjects in the frame, where the mesh may be determined based on the combination of the one or more body joints. In the illustrative aspect, the target subject is a person. Thus, a body segmentation algorithm may define a list of body joints that are to be identified and extracted from the video clip 108. The body joints may include, but not limited to, a head, neck, pelvis, spine, right/left shoulder, right/left upper arm, right/left forearm, right/left hand, right/left thigh, right/left leg, right/left foot, and right/left toe. In some examples, the list of body joints may be received at the communication interface 204 and stored as the body joints 250. In some aspects, the list of body joints may be received from a server (e.g., 106).

Additionally, the audio processing module 214 may include an audio acquisition manager 232 and an audio analyzer 234. The audio acquisition manager 232 is configured to receive, acquire, or otherwise obtain audio data. The audio analyzer 234 is configured to determine audio information of the audio data. For example, the audio information may include, but is not limited to, beat information and frequency spectrum information of each beat of the audio data. As an example, an automatic beat tracking algorithm may be used to determine the beat information. In some aspects, the beat information may be already embedded in the audio data as metadata. In other aspects, the beat information may be received at the communication interface 204 and stored as the audio data 248. The beat information provides beat characteristics of each beat. The beat characteristics include, but not limited to, a beat structure, a repeating sequence of strong and weak beats, a number of accented and unaccented beats, and relative positions of accented and unaccented beats. For example, if the audio music has a 4/4 beat structure, each section has four beats with different beat intensity: strong beat, first weak beat, second strong beat, and weak beat. Additionally, frequency spectrum information may be extracted from the audio data every predetermined time period (e.g., every beat). In some aspects, the frequency spectrum information may be already embedded in the audio data as metadata. In other aspects, the frequency spectrum information may be received at the communication interface 204 and stored as the audio data 248.

Furthermore, the video effect module 216 may further include a clothing effect generator 238 and a video effect synchronizer 240. The clothing effect generator 238 is configured to determine an effect to be applied to the virtual article of clothing and thus the video data, based on the audio data. Specifically, the clothing effect generator 238 is configured to determine one or more video effect parameters. For example, the clothing effect generator 238 is configured to determine one or more video effect parameters based on the audio data, where the determined one or more video effect parameters may be passed to a shader in order to control how the shader renders a texture associated with the virtual article of clothing. In an illustrative aspect, the virtual article of clothing is attached to or otherwise is rendered to the mesh surrounding a plurality of body joints of a target subject; the virtual article of clothing may move, change, or otherwise following a user as the user moves throughout the video clip. In an illustrative aspect, the texture of the virtual article of clothing may change with every beat. In other words, the beat of the selected audio music may control the change of the video effect that controls an appearance of the virtual article of clothing. As another example, one or more other attributes of the virtual article of clothing and/or the image in the video may change depending on the audio music. For example, a quantity of sparkles, a texture map opacity, a color, and a speed of movement may be based on the audio music.

The video effect synchronizer 240 is configured to synchronize the video effect to the music beat of the selected audio music to generate a rendered video with the video effect. The rendered video may be stored or otherwise provided as rendered video frames 254 of the output 244. In some aspects, the video effect synchronizer 240 is configured to modify the virtual article of clothing to blend a 2D texture of the virtual article of clothing to the 3D mesh around the body joints. It should be appreciated that the layering and blending of the 2D animated object on the 3D mesh may create a 3D-like animation effect.

The video effect synchronizer 240 includes or otherwise is in communication with the shader 218 and/or the sparkle shader 220. The shader 218 is configured to receive the video effect parameters. Based on the video effect parameters, the shader 218 is configured to generate or otherwise cause the effect to be rendered. For example, the shader 218 may change a visual effect associated with the video effect which may include, but is not limited to, a color, reflection, diffusion, translucency, transparency, metallicity, Fresnel reflection, and microsurface scattering. As another example, the sparkle shader 220 may change a visual effect associated with the video effect which may include, but is not limited to, a color, reflection, diffusion, translucency, transparency, metallicity, Fresnel reflection, and microsurface scattering. Further, the sparkle shader may render one or more graphics to video clip based on the video effect parameter and/or the audio music. For example, the sparkle shader may determine that the crystals spinning around a user should be rendered with a metallic and reflective look.

Figure 3B:
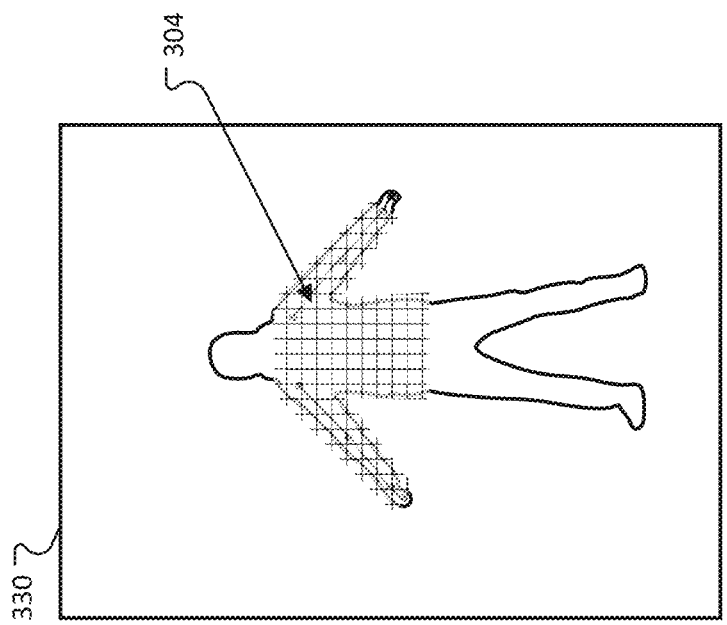
FIGS. 3A-3B depict an example of generating a mesh associated with a portion of a body in accordance with examples of the present disclosure.
Figure 3A:
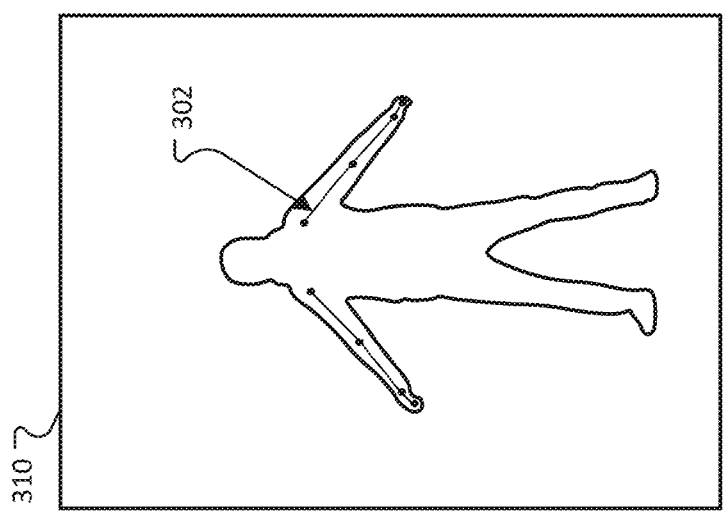

FIGS. 3A-3B illustrate an example of determining one or more body joints 302 and generating a mesh 304 associated with the one or more body joints 302. As depicted in FIG. 3A, one or more body joints 302 may be identified, where each body joint 302 may be associated with a predefined listing of body joints. Based on the identified body joints 302, a body part configured to receive an article of clothing may be identified. For example, a shirt may be identified based on the location of the body joints 302, where the upper torso is configured to receive the shirt. As depicted in FIG. 3B, a mesh 304 may be generated, where the mesh 304 is based on the body joints 302 of FIG. 3A. In examples, the mesh 304 of FIG. 3B may be used to attach a virtual article of clothing to a user. Accordingly, the mesh 304 assists with occlusion, where a person's body part is behind the virtual article of clothing, the person's hand may not be shown.

FIG. 3C-3E depict example video frames 310-330 depicting an example article of clothing 306 attached to a mesh, such as the mesh 304, in accordance with examples of the present disclosure. That is, the virtual article of clothing 306 may be a fanciful depiction of clothing virtually wearable by the user 308. In an illustrative example, the depiction of the virtual article of clothing 306 in the frame 310 may be reactive to the audio data 312. For example, a beat characteristic and/or frequency spectrum of the audio data 312 may cause the virtual article of clothing to change color. That is, characteristics of the audio data 312 may be determined and used to identify a video effect parameter, where the video effect parameter may be used to determine or otherwise alter how a shader renders a texture of the virtual article of clothing onto the mesh. Further, a sparkle shader may determine other characteristics of the virtual article of clothing (e.g., amount of sparkle) and/or how other graphics 314 (e.g., crystals) are depicted in the video frame 310.

As depicted in the frame 320 of FIG. 3D, the audio data 316 may be different than the audio data 312 of the frame 310. Accordingly, the shader may render a texture of the virtual article of clothing in frame 320 that is different than the texture of the virtual article of clothing 306 in frame 310. Alternatively, or in addition, the virtual article of clothing 318 may be the same as or similar to the virtual article of clothing 306 of frame 310. Further, the graphics 322 and/or other effects rendered by a sparkle shader may be different than the graphics 314 of frame 310. As further depicted in FIG. 3D, the virtual article of clothing 318 may be attached to or otherwise rendered to the mesh generated based on the body joints. Accordingly, as a user 308 raises their arms, the virtual article of clothing 318 conforms to the new joint locations and thus the new configuration of the body portion (e.g., torso).

As depicted in the frame 330 of FIG. 3E, the audio data 324 may be different than the audio data 316 of the frame 320. Accordingly, the shader may render a texture of the virtual article of clothing 326 in frame 330 that is different than the texture of the virtual article of clothing 318 in frame 320. Alternatively, or in addition, the virtual article of clothing 326 may be the same as or similar to the virtual article of clothing 318 of frame 320. Further, the graphics 328 and/or other effects rendered by a sparkle shader may be different than the graphics 322 of frame 320. As further depicted in FIG. 3E, the virtual article of clothing 326 may be attached to or otherwise rendered to the mesh generated based on the body joints. Accordingly, as a user 308 raises their arms, the virtual article of clothing 326 conforms to the new joint locations and thus the new configuration of the body portion (e.g., torso).

As described above, the virtual article of clothing may react to audio data. In examples, upon receiving audio data to be added to the video clip, audio information (e.g., beat characteristics and/or frequency spectrum) of the audio data may be determined for every predetermined time period (e.g., a music beat). Based on the audio information, the texture rendered by the shader may change. For example, if the audio music that has a 4/4 beat structure, a first texture may be rendered; if the music has a 3/4 beat structure, a second texture may be rendered; if the music has a 2/4 beat structure, a third texture may be rendered, where the first, second, and third texture are different from one another. As another example, if the audio music has a strong beat, a fourth texture may be rendered; if the music has a first weak beat, a fifth texture may be rendered; if the music has a second weak beat, a sixth texture may be rendered, where the fourth, fifth, and sixth texture are different from one another. Alternatively, the animation effect may be determined based on the frequency spectrum range as previously described. In other words, the beat or spectrum of the audio music controls the texture that is rendered to the virtual article of clothing in the video clip.

Figure 4:
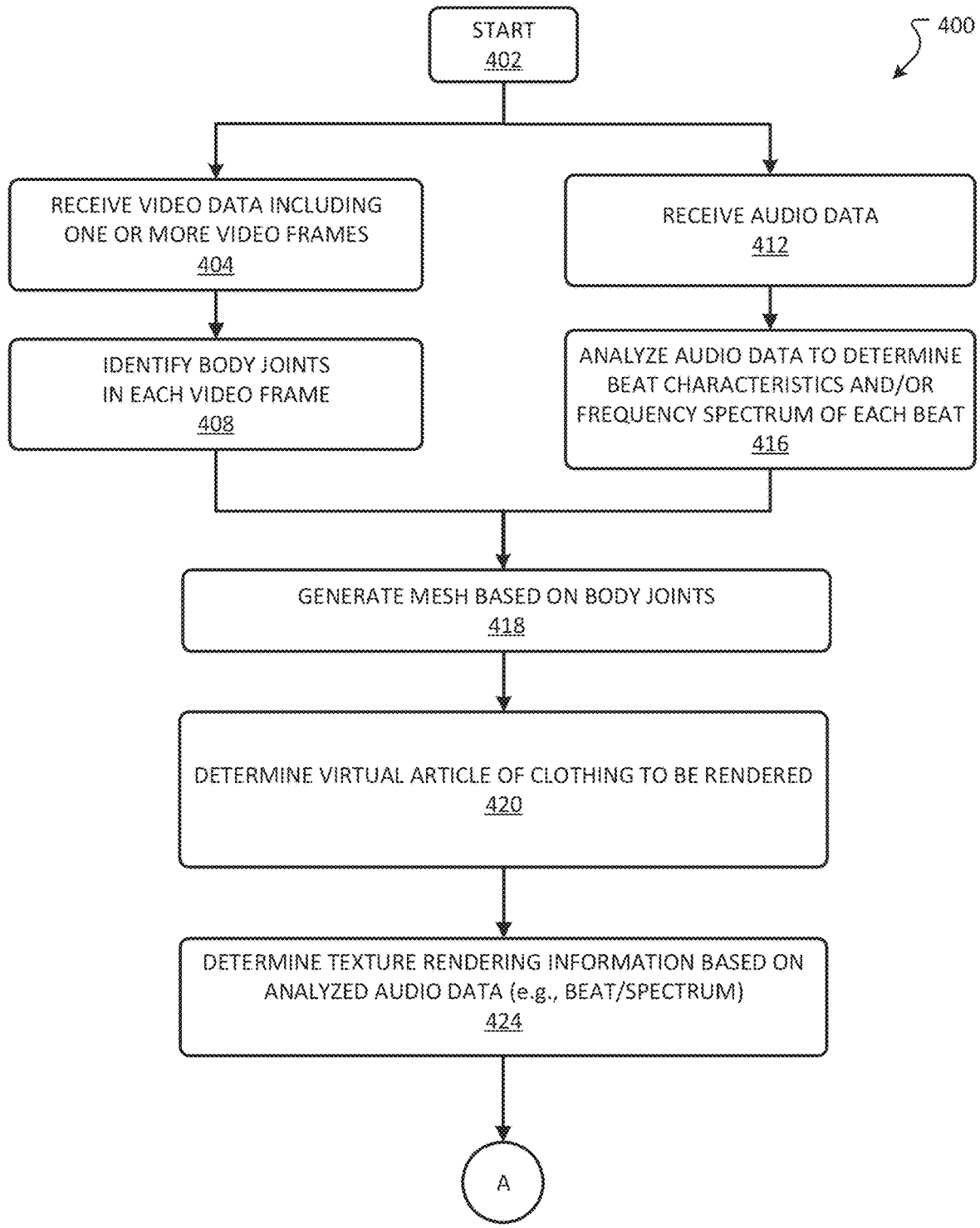
FIGS. 4 and 5 depict details of a method for rendering a virtual article of clothing in accordance with examples of the present disclosure.
Figure 5:
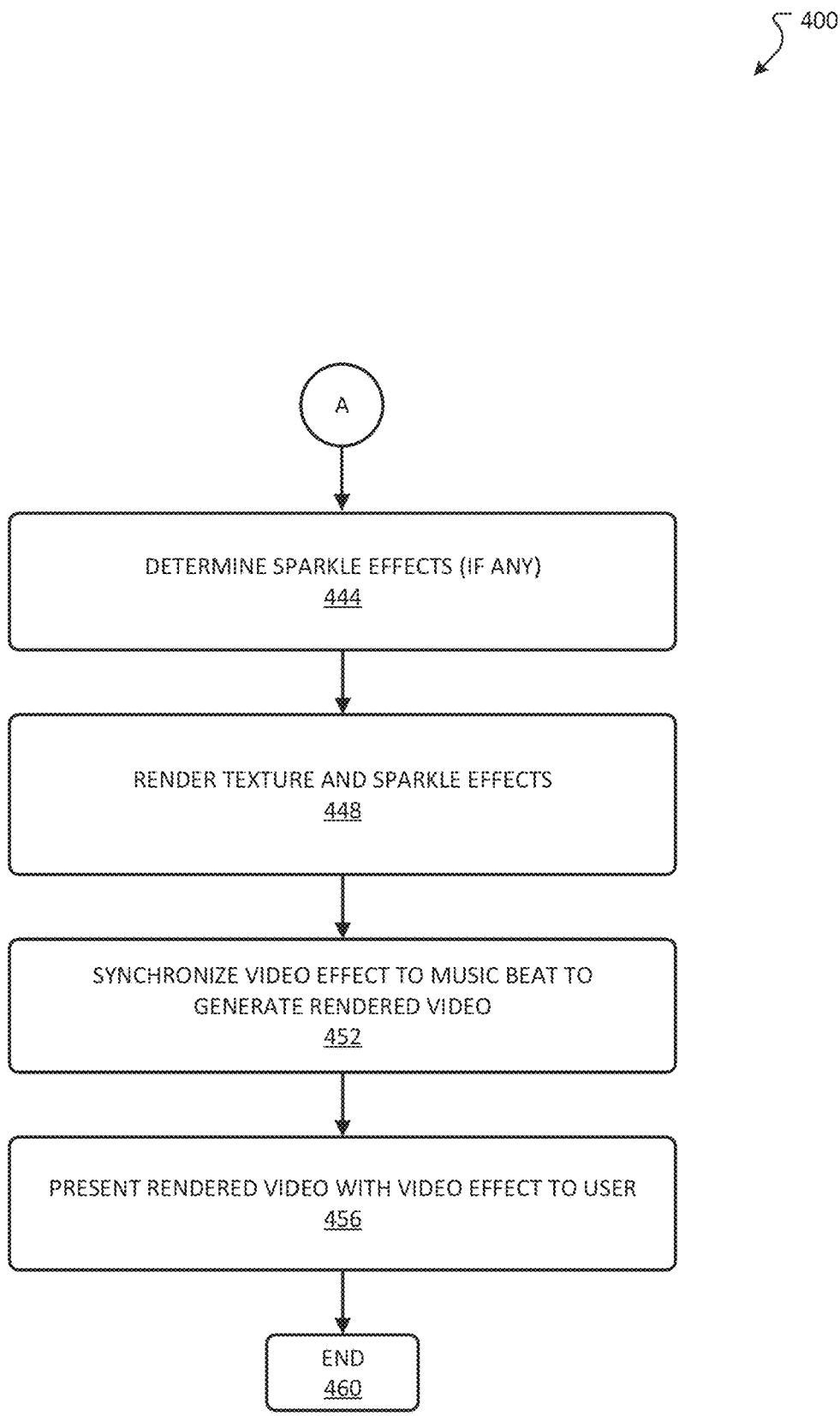

Referring now to FIG. 4, a simplified method for rendering a virtual article of clothing based on audio data in accordance with examples of the present disclosure is described. A general order for the steps of a method 400 is shown in FIGS. 4-5. Generally, the method 400 starts at 402 and ends at 460. The method 400 may include more or fewer steps or may arrange the order of the steps differently than those shown in FIGS. 4-5. The method 400 can be executed as a set of computer-executable instructions executed by a computer system and encoded or stored on a computer readable medium. In the illustrative aspect, the method 400 is executed by a computing device associated with a user (e.g., 102). However, it should be appreciated that aspects of the method 400 may be performed by one or more processing devices, such as a computer or server (e.g., 104, 106). Further, the method 400 can be performed by gates or circuits associated with a processor, Application Specific Integrated Circuit (ASIC), a field programmable gate array (FPGA), a system on chip (SOC), a neural processing unit, or other hardware device. Hereinafter, the method 400 shall be explained with reference to the systems, components, modules, software, data structures, user interfaces, etc. described in conjunction with FIGS. 1 and 2.

The method 400 starts at 402, where flow may proceed to 404. At 404, the computing device receives video data (e.g., video clip 108) including one or more video frames. For example, a user 102 may generate, receive, acquire, or otherwise obtain a video clip 108 via the computing device. At 408, the computing device processes each frame of the video data to identify body joints of one or more target subjects in the frame. For example, a body joint algorithm may define a list of body joints that are to be identified and extracted from the video clip 108. The body joints may include, but not limited to, a head, neck, pelvis, spine, right/left shoulder, right/left upper arm, right/left forearm, right/left hand, right/left thigh, right/left leg, right/left foot, and right/left toe.

Referring back to the start 402, the method 400 may proceed to 412. It should be appreciated that the computing device may perform the operations 404 and 412 simultaneously. Alternatively, the operation 412 may be performed subsequent to the operation 404. In some aspects, the operation 404 may be performed subsequent to the operation 412.

At 412, the computing device receives audio data (e.g., audio music 110) selected by the user 102 to be added to the video data. Subsequently, at 416, the computing device analyzes the audio data to determine audio information of the audio music 110. For example, the audio information includes beat characteristics and/or frequency spectrum of each beat. In some aspects, the computing device may determine beat characteristics of each beat through an automatic beat tracking algorithm. The beat characteristics include, but not limited to, a beat structure, a repeating sequence of strong and weak beats, a number of accented and unaccented beats, and relative positions of accented and unaccented beats. For example, if the audio music 110 has a 4/4 beat structure, each section has four beats with different beat intensity: strong beat, weak beat, second strong beat, and weak beat. In other aspects, the computing device may determine a frequency of each beat to associate with a particular frequency range (e.g., high range, medium range, and low range).

Once the video data and the audio data are received and analyzed in operations 404-416, the method 400 proceeds to 418. At 418, the computing device may generate a mesh based on the body joints identified at 408. For example, a mesh for an upper torso may be based on the body joints of left/right arms, a head, and a neck being identified. The method 400 may proceed to 420, where the computing device determines a virtual article of clothing to be applied to the mesh generated in 418. For example, a user may select a virtual article of clothing to virtually try on, where the virtual article of clothing may be a fanciful depiction of clothing and may react to audio data. As another example, the virtual article of clothing may be a default item of clothing. The method 400 may then proceed to 424, where texture rendering information associated with the determined article of clothing may be determined. For example, a video effect parameter may be based on the analyzed audio data at 416. The video effect parameter may control how the shader renders the texture. In examples, the rendering information may include, but is not limited to a color, a reflectivity, an opacity, a transparency, etc. and may be specific to a combination of the audio data and the virtual article of clothing. That is, if the audio music that has a certain beat structure and a beat strength, a video effect parameter may be different than audio music having a different beat structure and/or a different beat strength. Subsequently, the method 400 proceeds to 444 in FIG. 5 as shown by the alphanumeric character A in FIGS. 4 and 5.

At 444, sparkle effects associated with the audio music and/or the virtual article of clothing may be determined. In examples, a sparkle shader different from a main shader for rendering texture information of the virtual article of clothing may be used. The sparkle shader may determine different characteristics to be applied to the video frame and/or graphics within the video frame than the main shader. As an example, graphical information may include crystals spinning in the frame or other graphics of a sparkly nature. In some examples, the sparkle effects may be a glowing effect or other effect that affects the virtual article of clothing and/or other graphics in the video frame.

Once the texture rendering information and the sparkle effects are determined at animated object and the corresponding animation effect(s) are determined at 424 and 444 respectively, the method 400 proceeds to operation 448. At 448, the computing device renders the texture and sparkle effects in accordance with the audio data analyzed at 416. In some examples, a video effect is synchronized to the music beat or spectrum of the selected audio music to generate a rendered video with the virtual article of clothing at 452. For example, the video effect may relate to how quickly a color or other perceived quality of the virtual article of clothing changes. At 456, the computing device presents the rendered video with the video effect to the user on a display (e.g., a display 705). It should be appreciated that the changes to the virtual article of clothing may be synchronized to the music beat in or near real-time to allow the user to view the virtual article of clothing as attached to the mesh generated around the one or more body joints. As another example, as a user depicted in the video moves, the virtual article of clothing may move with the user. The method may end at 460.

It should be appreciated that, although the method 400 is described to be performed by the computing device associated with the user, one or more operations of the method 400 may be performed by any computing device or server, such as the server 106. For example, the synchronization of the video effect to the music beat may be performed by the server, which receives the music and the video clip from the computing device associated with a user.

Figure 6:
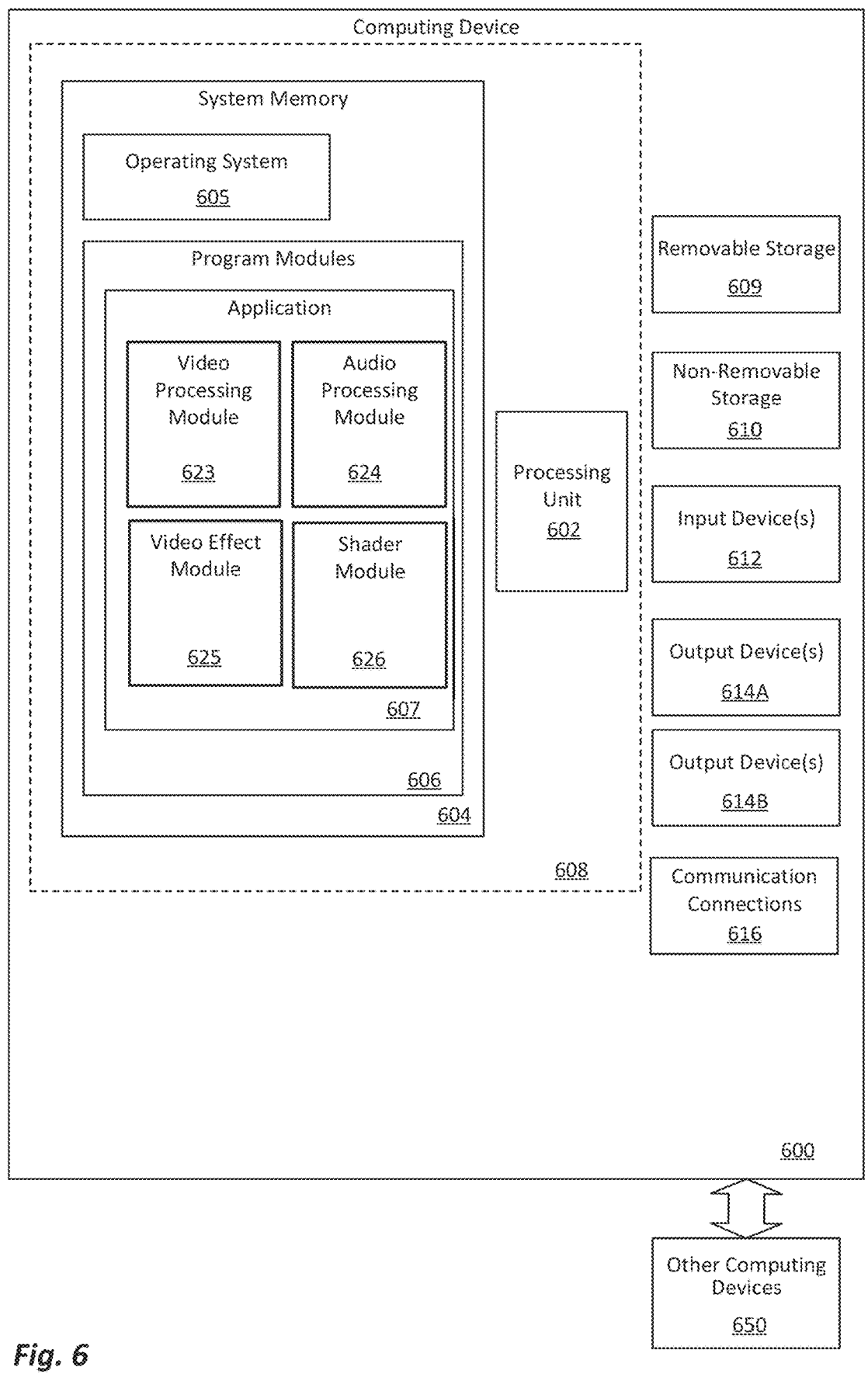
FIG. 6 depicts a block diagram illustrating physical components (e.g., hardware) of a computing device with which aspects of the disclosure may be practiced.

FIG. 6 is a block diagram illustrating physical components (e.g., hardware) of a computing device 600 with which aspects of the disclosure may be practiced. The computing device components described below may be suitable for the computing devices described above. For example, the computing device 600 may represent the computing device 104 of FIG. 1. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories.

The system memory 604 may include an operating system 605 and one or more program modules 606 suitable for performing the various aspects disclosed herein such. The operating system 605, for example, may be suitable for controlling the operation of the computing device 600. Furthermore, aspects of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, several program modules and data files may be stored in the system memory 604. While executing on the at least one processing unit 602, the program modules 606 may perform processes including, but not limited to, one or more aspects, as described herein. The application(s) 607 includes a video processing module 623, an audio processing module 624, a video effect module 625, and a shader module 626, as described in more detail with regard to FIG. 1. Other program modules that may be used in accordance with aspects of the present disclosure may include electronic mail and contacts applications, word processing applications, spreadsheet applications, database applications, slide presentation applications, drawing or computer-aided application programs, etc., and/or one or more components supported by the systems described herein.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general-purpose computer or in any other circuits or systems.

The computing device 600 may also have one or more input device(s) 612 such as a keyboard, a mouse, a pen, a sound or voice input device, a touch or swipe input device, etc. The output device(s) 614A such as a display, speakers, a printer, etc. may also be included. An output 614B, corresponding to a virtual display may also be included. The aforementioned devices are examples and others may be used. The computing device 600 may include one or more communication connections 616 allowing communications with other computing devices 650. Examples of suitable communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7A:
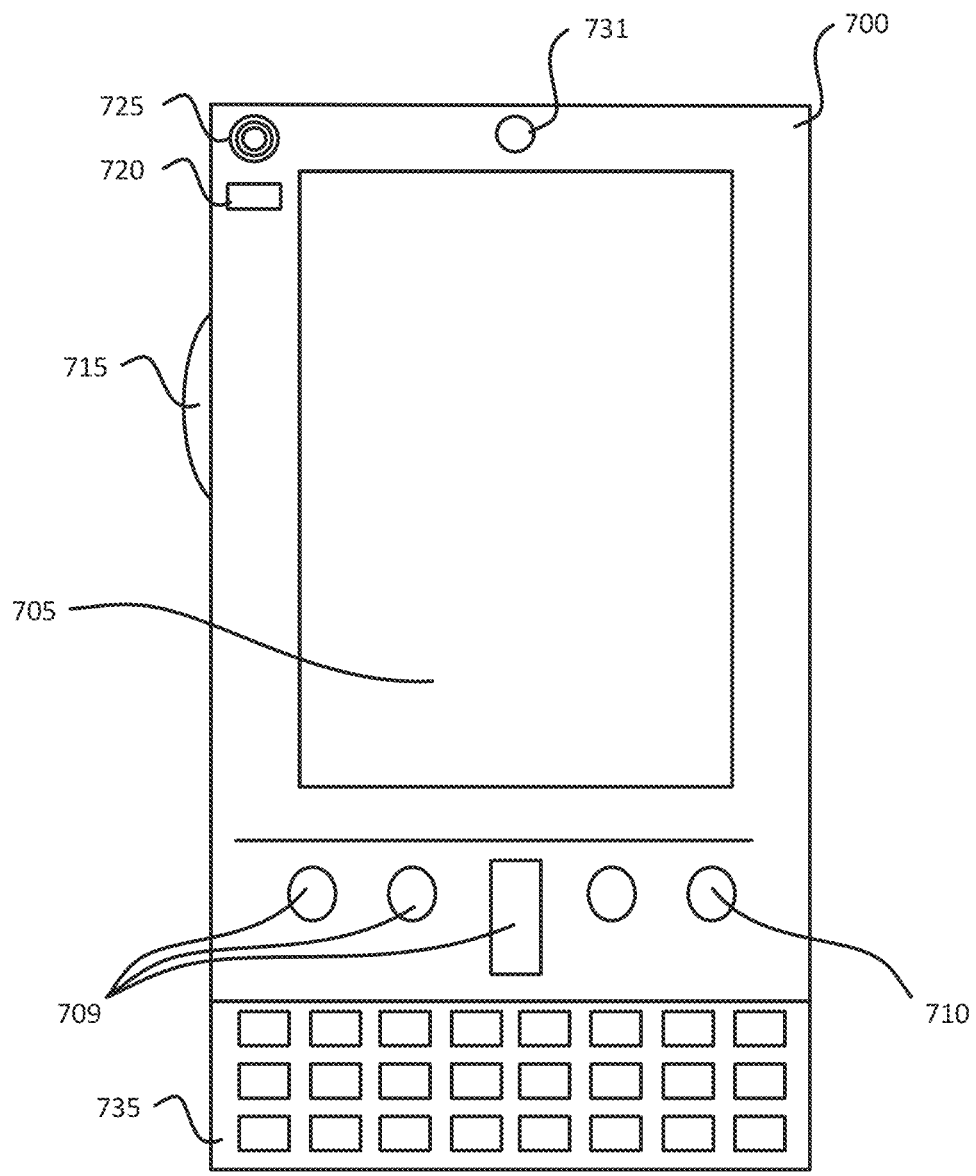
FIG. 7A illustrates a first example of a computing device with which aspects of the disclosure may be practiced.
Figure 7B:
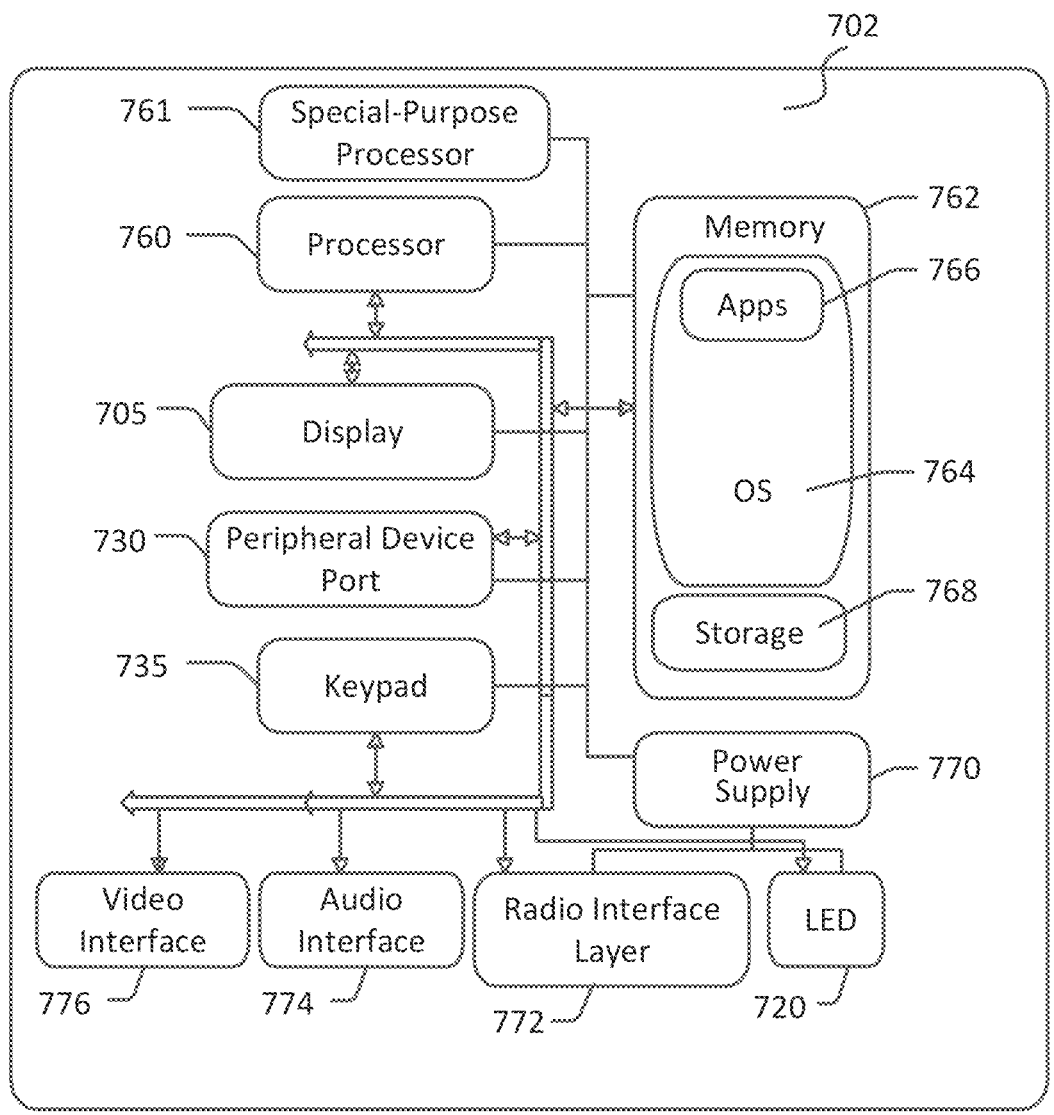
FIG. 7B illustrates a second example of a computing device with which aspects of the disclosure may be practiced.

FIGS. 7A and 7B illustrate a computing device or mobile computing device 700, for example, a mobile telephone, a smart phone, wearable computer (such as a smart watch), a tablet computer, a laptop computer, and the like, with which aspects of the disclosure may be practiced. With reference to FIG. 7A, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 709/710 that allow the user to enter information into the mobile computing device 700. The display 705 of the mobile computing device 700 may also function as an input device (e.g., a touch screen display). If included, an optional side input element 715 allows further user input. The side input element 715 may be a rotary switch, a button, or any other type of manual input element. In alternative aspects, mobile computing device 700 may incorporate more or less input elements. For example, the display 705 may not be a touch screen in some aspects. In yet another alternative aspect, the mobile computing device 700 is a portable phone system, such as a cellular phone. The mobile computing device 700 may also include an optional keypad 735. Optional keypad 735 may be a physical keypad or a "soft" keypad generated on the touch screen display. In various aspects, the output elements include the display 705 for showing a graphical user interface (GUI), a visual indicator 731 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports 730, such as an audio input (e.g., a microphone jack), an audio output (e.g., a headphone jack), and a video output (e.g., a HDMI port) for sending signals to or receiving signals from an external source.

FIG. 7B is a block diagram illustrating the architecture of one aspect of computing device, a server, or a mobile computing device. That is, the mobile computing device 700 can incorporate a system (702) (e.g., an architecture) to implement some aspects. The system 702 can implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and/or one or more components supported by the systems described herein. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700 described herein (e.g. a video processing module 623, an audio processing module 624, a video effect module 625, and a shader module 626, etc.).

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 may be used to provide visual notifications, and/or an audio interface 774 may be used for producing audible notifications via the audio transducer 725. In the illustrated configuration, the visual indicator 720 is a light emitting diode (LED) and the audio transducer 725 is a speaker. These devices may be directly coupled to the power supply 770 so that when activated, they remain on for a duration dictated by the notification mechanism even though the processor 760/761 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with aspects of the present disclosure, the microphone may also serve as an audio sensor to facilitate control of notifications, as will be described below. The system 702 may further include a video interface 776 that enables an operation of an on-board camera to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

Figure 8:
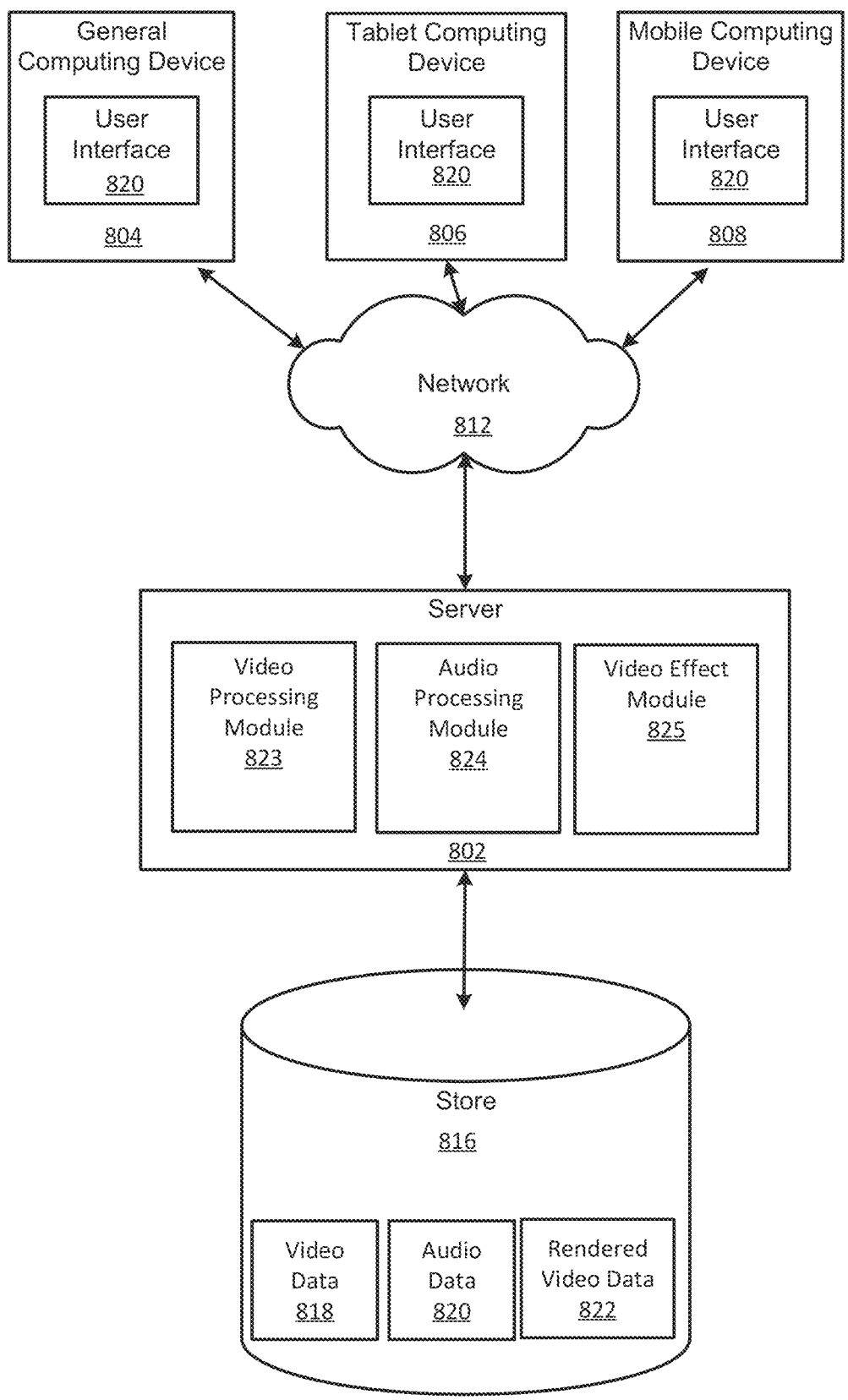
FIG. 8 illustrates at least one aspect of an architecture of a system for processing data in accordance with examples of the present disclosure.

FIG. 8 illustrates one aspect of the architecture of a system for processing data received at a computing system from a remote source, such as a computing device 804, tablet computing device 806, or mobile computing device 808, as described above. Content displayed at server device 802 may be stored in different communication channels or other storage types. For example, the computing device 804, 806, 808 may represent the computing device 104 of FIG. 1, and the server device 802 may represent the server 106 of FIG. 1.

In some aspects, one or more of a video processing module 823, an audio processing module 824, and a video effect module 825, may be employed by server device 802. The server device 802 may provide data to and from a client computing device such as a computing device 804, a tablet computing device 806 and/or a mobile computing device 808 (e.g., a smart phone) through a network 812. By way of example, the computer system described above may be embodied in a computing device 804, a tablet computing device 806 and/or a mobile computing device 808 (e.g., a smart phone). Any of these aspects of the computing devices may obtain content from the store 816, in addition to receiving graphical data usable to be either pre-processed at a graphic-originating system, or post-processed at a receiving computing system. The content store may include video data 818, audio data 820, and rendered video data 822.

FIG. 8 illustrates an exemplary mobile computing device 808 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically.

The exemplary systems and methods of this disclosure have been described in relation to computing devices. However, to avoid unnecessarily obscuring the present disclosure, the preceding description omits several known structures and devices. This omission is not to be construed as a limitation. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed configurations and aspects.

Several variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

The disclosure is not limited to standards and protocols if described. Other similar standards and protocols not mentioned herein are in existence and are included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure relates to systems and methods for generating a virtual article of clothing at a display in accordance with at least the examples provided in the sections below:

(A1) In one aspect, some examples include a method for generating a virtual article of clothing at a display. The method may include: obtaining video data and audio data, analyzing the video data to determine one or more body joints of a target object appearing in the video data, generating a mesh based on the determined one or more body joints, analyzing the audio data to determine audio characteristics, determining texture rendering information associated with a virtual article of clothing based on the audio characteristics and generating a rendered video by rendering the virtual article of clothing to the generated mesh using the texture rendering information.

(A2) In some examples of A1, the method further includes: determining at least one of a beat characteristic or a frequency spectrum value from the audio data; selecting at least one video effect parameter based on the at least one of the beat characteristic or the frequency spectrum value; determining texture rendering information based on the at least one video effect parameter; and rendering the virtual article of clothing to the generated mesh using the texture rendering information, wherein the texture rendering information is based on the at least one of the beat characteristic or the frequency spectrum value.

(A3) In some examples of A1-A2, the method further includes: rendering, using a first shader, the virtual article of clothing; and rendering, using a second shader different from the first shader, one or more graphics, wherein the one or more graphics are rendered according to the at least one of the beat characteristic or the frequency spectrum value.

(A4) In some examples of A1-A3, the method further includes: determining at least one of a second beat characteristic or a second frequency spectrum value from the audio data; and selecting a second video effect parameter based on the at least one of the second beat characteristic or the second frequency spectrum value; determining second texture rendering information based on the at least one of the second beat characteristic or the second frequency spectrum value; and rendering the virtual article of clothing to the generated mesh using the second texture rendering information, wherein the second texture rendering information is based on the at least one of the second beat characteristic or the second frequency spectrum value.

(A5) In some examples of A1-A4, the method further includes: synchronizing a change from the first texture rendering information to the second texture rendering information based on the audio data.

(A6) In some examples of A1-A5 the texture rendering information comprises at least one of an opacity, transparency, and metallicity.

(A7) In some examples of A1-A6 the mesh comprises a three-dimensional mesh around the determined one or more body joints depicted in the video data.

(A8) In some examples of A1-A7, obtaining the audio data comprises selecting the audio data from a music library, and wherein the audio characteristics are embedded in the audio data as metadata.

In yet another aspect, some examples include a system including one or more processors and memory coupled to the one or more processors, the memory storing one or more instructions which when executed by the one or more processors, causes the one or more processors to perform any of the methods described herein (e.g., A1-A8 described above).

In yet another aspect, some examples include a computer-readable storage medium storing one or more programs for execution by one or more processors of a device, the one or more programs including instructions for performing any of the methods described herein (e.g., A1-A8 described above).

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

What is claimed is:

1. A method for generating a virtual article of clothing at a display, the method comprising:
    obtaining video data and audio data;
    analyzing the video data to determine one or more body joints of a target object appearing in the video data;
    generating a mesh based on the determined one or more body joints;
    analyzing the audio data to determine audio characteristics;
    determining the audio characteristics including at least one of a beat characteristic of the audio data or a frequency spectrum value of the audio data;
    determining texture rendering information associated with a virtual article of clothing based on the determined audio characteristics; and
    generating a rendered video by rendering the virtual article of clothing to the generated mesh using the texture rendering information.

2. The method of claim 1, further comprising:
    selecting at least one video effect parameter based on the at least one of the beat characteristic or the frequency spectrum value;
    determining texture rendering information based on the at least one video effect parameter; and
    rendering the virtual article of clothing to the generated mesh using the texture rendering information, wherein the texture rendering information is based on the at least one of the beat characteristic or the frequency spectrum value.

3. The method of claim 2, further comprising:
    rendering, using a first shader, the virtual article of clothing; and
    rendering, using a second shader different from the first shader, one or more graphics, wherein the one or more graphics are rendered according to the at least one of the beat characteristic or the frequency spectrum value.

4. The method of claim 2, further comprising:
    determining at least one of a second beat characteristic of the audio data or a second frequency spectrum value of the audio data;
    selecting a second video effect parameter based on the at least one of the second beat characteristic or the second frequency spectrum value;
    determining second texture rendering information based on the at least one of the second beat characteristic or the second frequency spectrum value; and
    rendering the virtual article of clothing to the generated mesh using the second texture rendering information, wherein the second texture rendering information is based on the at least one of the second beat characteristic or the second frequency spectrum value.

5. The method of claim 4, further comprising:
    synchronizing a change from the texture rendering information to the second texture rendering information based on the audio data.

6. The method of claim 1, wherein the texture rendering information comprises at least one of an opacity, transparency, and metallicity.

7. The method of claim 1, wherein the mesh comprises a three-dimensional mesh around the determined one or more body joints depicted in the video data.

8. The method of claim 1, wherein obtaining the audio data comprises selecting the audio data from a music library, and wherein the audio characteristics are embedded in the audio data as metadata.

9. A computing device for generating a virtual article of clothing at a display, the computing device comprising:
    a processor; and
    a memory having a plurality of instructions stored thereon that, when executed by the processor, causes the computing device to:
        obtain video data and audio data;
        analyze the video data to determine one or more body joints of a target object appearing in the video data;
        generate a mesh based on the determined one or more body joints;
        analyze the audio data to determine audio characteristics;
        determine the audio characteristics including at least one of a beat characteristic of the audio data or a frequency spectrum value of the audio data;
        determine texture rendering information associated with a virtual article of clothing based on the determined audio characteristics; and
        generate a rendered video by rendering the virtual article of clothing to the generated mesh using the texture rendering information.

10. The computing device of claim 9, wherein the plurality of instructions, when executed, further cause the computing device to:
    select at least one video effect parameter based on the at least one of the beat characteristic or the frequency spectrum value;
    determine texture rendering information based on the at least one video effect parameter; and
    render the virtual article of clothing to the generated mesh using the texture rendering information, wherein the texture rendering information is based on the at least one of the beat characteristic or the frequency spectrum value.

11. The computing device of claim 10, wherein the plurality of instructions, when executed, further cause the computing device to:
- render, using a first shader, the virtual article of clothing; and
- render, using a second shader different from the first shader, one or more graphics, wherein the one or more graphics are rendered according to the at least one of the beat characteristic or the frequency spectrum value.

12. The computing device of claim 10, wherein the plurality of instructions, when executed, further cause the computing device to:
- determine at least one of a second beat characteristic of the audio data or a second frequency spectrum value of the audio data;
- select a second video effect parameter based on the at least one of the second beat characteristic or the second frequency spectrum value;
- determine second texture rendering information based on the at least one of the second beat characteristic or the second frequency spectrum value; and
- render the virtual article of clothing to the generated mesh using the second texture rendering information, wherein the second texture rendering information is based on the at least one of the second beat characteristic or the second frequency spectrum value.

13. The computing device of claim 12, wherein the plurality of instructions, when executed, further cause the computing device to:
- synchronize change from the texture rendering information to the second texture rendering information based on the audio data.

14. The computing device of claim 9, wherein the texture rendering information comprises at least one of an opacity, transparency, and metallicity.

15. The computing device of claim 9, wherein the mesh is a three-dimensional mesh is around one or more body joints depicted in the video data.

16. A non-transitory computer-readable medium storing instructions for generating a virtual article of clothing at a display, the instructions when executed by one or more processors of a computing device, cause the computing device to:
- obtain video data and audio data;
- analyze the video data to determine one or more body joints of a target object appearing in the video data;
- generate a mesh based on the determined one or more body joints;
- analyze the audio data to determine audio characteristics;
- determine the audio characteristics including at least one of a beat characteristic of the audio data or a frequency spectrum value of the audio data;
- determine texture rendering information associated with a virtual article of clothing based on the determined audio characteristics; and
- generate a rendered video by rendering the virtual article of clothing to the generated mesh using the texture rendering information.

17. The non-transitory computer-readable medium of claim 16, wherein the instructions when executed by the one or more processors further cause the computing device to:
- select at least one video effect parameter based on the at least one of the beat characteristic or the frequency spectrum value;
- determine texture rendering information based on the at least one video effect parameter; and
- render the virtual article of clothing to the generated mesh using the texture rendering information, wherein the texture rendering information is based on the at least one of the beat characteristic or the frequency spectrum value.

18. The non-transitory computer-readable medium of claim 17, wherein the instructions when executed by the one or more processors further cause the computing device to:
- render, using a first shader, the virtual article of clothing; and
- render, using a second shader different from the first shader, one or more graphics, wherein the one or more graphics are rendered according to the at least one of the beat characteristic or the frequency spectrum value.

19. The non-transitory computer-readable medium of claim 17, wherein the instructions when executed by the one or more processors further cause the computing device to:
- determine at least one of a second beat characteristic of the audio data or a second frequency spectrum value of the audio data;
- select a second video effect parameter based on the at least one of the second beat characteristic or the second frequency spectrum value;
- determine second texture rendering information based on the at least one of the second beat characteristic or the second frequency spectrum value; and
- render the virtual article of clothing to the generated mesh using the second texture rendering information, wherein the second texture rendering information is based on the at least one of the second beat characteristic or the second frequency spectrum value.

20. The non-transitory computer-readable medium of claim 16, wherein the texture rendering information comprises at least one of an opacity, transparency, and metallicity.

* * * * *